(No Model.)
G. WATKINSON.
METHOD OF MAKING RUBBER BOOTS OR SHOES.
No. 360,635. Patented Apr. 5, 1887.
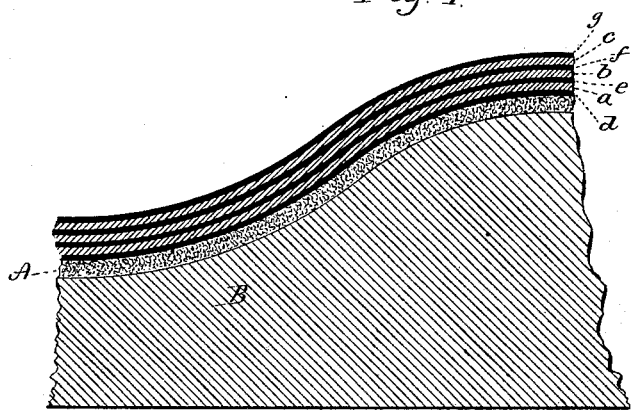
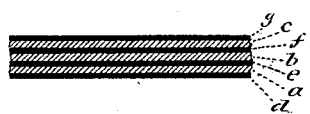
Witnesses
J. F. Shumway
Fred C. Earle
Geo. Watkinson, Inventor
By atty.
Wm. C. Earle

UNITED STATES PATENT OFFICE.

GEORGE WATKINSON, OF NEW HAVEN, CONNECTICUT, ASSIGNOR TO THE L. CANDEE & COMPANY, OF SAME PLACE.

METHOD OF MAKING RUBBER BOOTS OR SHOES.

SPECIFICATION forming part of Letters Patent No. 360,635, dated April 5, 1887.

Application filed December 1, 1886. Serial No. 220,347. (No model.)

*To all whom it may concern:*

Be it known that I, GEORGE WATKINSON, of New Haven, in the county of New Haven and State of Connecticut, have invented a new Improvement in India-Rubber Boots; and I do hereby declare the following, when taken in connection with the accompanying drawings and the letters of reference marked thereon, to be a full, clear, and exact description of the same, and which said drawings constitute part of this specification, and represent, in—

Figure 1, a portion of the upper of a boot as on the last, enlarged; Fig. 2, a section of the outer enlarged, illustrating the method of its preparation.

This invention relates to an improvement in the manufacture of india-rubber boots, with special reference to the uppers.

In the usual method of manufacturing india-rubber boots the lining, which is of felt or fabric of similar character, is prepared upon its outer surface with a coating of india-rubber, and the blank cut from the coated lining to the required shape is placed upon and fitted to the last, the coated side outward. Then a thickness of india-rubber cut from a sheet of clear rubber is applied and worked down upon the lining. Then a like-shaped part of fabric prepared is applied to the india-rubber on the last. Then a thickness of india-rubber is applied to the surface of this prepared fabric, each thickness being applied successively. In thus applying successive thicknesses of material great care must be exercised to prevent air-blisters. These will occur unless there be perfect adhesion between the adjacent thicknesses throughout. Under this usual method of manufacture two thicknesses beside the lining are all that can be applied with any degree of certainty of perfect adhesion.

Parts of the boot are frequently thickened by applying portions to the points where greater wear is expected; but in many cases it is desirable to make the upper of much greater thickness than can be done by applying layer over layer. To do this and make the foot portion of the boot thick throughout is the object of my invention; and it consists in cutting the upper from several thicknesses of fabric with interposed thicknesses of india-rubber, and with a coating of rubber upon both sides of the combined thicknesses, the said thicknesses and coatings being combined and united before the parts are cut therefrom, and then applying the parts so cut and composed of several thicknesses directly to the lining, which has been previously placed upon the last, the said combined thicknesses worked down upon the lining, and whereby the several thicknesses of the parts so applied being previously united are prevented from blistering, and the cost of manufacture is greatly reduced because of so applying the several thicknesses at one single operation.

In Fig. 2 I illustrate the material from which the outer of the boot is to be cut considerably magnified, and as consisting of three thicknesses of fabric, *a, b,* and *c*. Upon the outer side of the thickness *a* is a coating of india-rubber. Between the thicknesses *a b* is a layer of india-rubber, *e*. Between the thicknesses *b c* is a layer of india-rubber, *f*, and outside the thickness *c* is a coating of india-rubber, *g*. These several thicknesses of india-rubber and fabric are united in the rolls in the usual manner; but while the rubber is in the plastic state the blank is cut from this combined rubber and fabric of the required shape for the outer portion of the boot.

The lining A is applied to the last B in the usual manner, this lining having its outer surface previously prepared to receive the india-rubber surface of the outer in the usual manner. Then the part which has been cut from the combined thicknesses of rubber and fabric while still in the plastic state is applied to the surface of the lining, and rubbed down thereon in the usual manner, so that the outer is perfectly united to the lining.

The elastic and plastic character of the combined thicknesses of india-rubber and fabric permit the outer to be readily shaped to the surface of the lining on the last.

Because the several thicknesses of india-rubber and fabric which compose the outer are united prior to applying to the lining, the separation of those thicknesses in applying to the lining on the last is impossible, and hence air-bubbles cannot form between those thicknesses, and consequently blistering, due to such imperfect attachment of the thicknesses, is avoided, and as many thicknesses of india-rubber and fabric thus combined may be employed as may be desirable, because being so combined they are applied to the lining on the last as one thickness.

Otherwise than as applying the combined thicknesses of india-rubber and fabric, the boot is treated in the usual manner and finished by vulcanization.

I claim—

The herein-described improvement in the process of manufacturing india-rubber boots, which consists in first coating the outer surface of the fabric lining and then applying the said lining to the last; second, uniting a series of layers of fabric and rubber to form the outer; third, applying the said composite outer to the lining, and, finally, vulcanizing the boot, substantially as described.

GEORGE WATKINSON.

Witnesses:
JOHN E. EARLE,
FRED C. EARLE.